US008185590B2

(12) United States Patent
Simmons et al.

(10) Patent No.: US 8,185,590 B2
(45) Date of Patent: May 22, 2012

(54) SYSTEM AND METHOD FOR REPLICATING OFFLINE SCHEDULING TRANSACTIONS FROM A CLIENT TO A SERVER

(75) Inventors: Daniel Simmons, Sammamish, WA (US); Josh Lindquist, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1004 days.

(21) Appl. No.: 11/004,315

(22) Filed: Dec. 2, 2004

(65) Prior Publication Data

US 2006/0123088 A1 Jun. 8, 2006

(51) Int. Cl.
*G06F 15/16* (2006.01)
(52) U.S. Cl. .......................... 709/206; 709/204; 709/207
(58) Field of Classification Search .................. 709/206, 709/238, 247, 204
See application file for complete search history.

(56) References Cited

U.S. PATENT DOCUMENTS

| | | | | |
|---|---|---|---|---|
| 5,432,841 | A * | 7/1995 | Rimer | 455/457 |
| 5,826,269 | A * | 10/1998 | Hussey | 1/1 |
| 5,923,552 | A * | 7/1999 | Brown et al. | 700/100 |
| 5,951,636 | A * | 9/1999 | Zerber | 709/202 |
| 6,324,587 | B1 * | 11/2001 | Trenbeath et al. | 719/310 |
| 6,370,566 | B2 * | 4/2002 | Discolo et al. | 709/206 |
| 6,463,463 | B1 * | 10/2002 | Godfrey et al. | 709/206 |
| 6,615,241 | B1 * | 9/2003 | Miller et al. | 709/206 |
| 6,745,197 | B2 * | 6/2004 | McDonald | 1/1 |
| 6,985,871 | B2 * | 1/2006 | Simon et al. | 705/7.24 |
| 7,340,691 | B2 * | 3/2008 | Bassett et al. | 715/255 |
| 7,421,401 | B2 * | 9/2008 | Demsky et al. | 705/7.19 |
| 2001/0054072 | A1 * | 12/2001 | Discolo et al. | 709/206 |
| 2002/0054335 | A1 * | 5/2002 | Sekiguchi | 358/1.15 |
| 2002/0069282 | A1 * | 6/2002 | Reisman | 709/227 |
| 2002/0198945 | A1 * | 12/2002 | Thomas | 709/206 |
| 2003/0055652 | A1 * | 3/2003 | Nichols et al. | 704/275 |
| 2003/0105812 | A1 * | 6/2003 | Flowers et al. | 709/203 |
| 2003/0137536 | A1 * | 7/2003 | Hugh | 345/744 |
| 2003/0193960 | A1 * | 10/2003 | Land | 370/401 |
| 2004/0083477 | A1 * | 4/2004 | Acharya et al. | 718/102 |
| 2004/0141508 | A1 * | 7/2004 | Schoeneberger et al. | 370/401 |
| 2004/0230658 | A1 * | 11/2004 | Estrada et al. | 709/206 |
| 2005/0102365 | A1 * | 5/2005 | Moore et al. | 709/207 |
| 2005/0198299 | A1 * | 9/2005 | Beck et al. | 709/226 |

* cited by examiner

*Primary Examiner* — Saleh Najjar
*Assistant Examiner* — Tae Kim
(74) *Attorney, Agent, or Firm* — Perkins Coie LLP

(57) ABSTRACT

A facility for replicating offline scheduling transactions directed to a server is provided. The facility is implemented as a client-side application that integrates with and utilizes components of a store-and-forward application, which is operable to execute on a client to guarantee that transactions submitted on the client are replicated and carried out on a service hosted on a remote server even in light of intermittent connectivity between the client, the server, and networks. Records describing transactions intended remote service are written to an outbox of the store-and-forward application on the client. When online, the store-and-forward application first invokes the facility, which processes the items in the outbox by iteratively retrieving the items from the outbox and, for each item, determining whether the item is a transaction intended for the scheduling application. If the item is intended for the scheduling application, the facility sends the item to the scheduling application. Otherwise, if the item is not intended for the scheduling application, the facility returns the item to the outbox for processing by other components of the store-and-forward application.

16 Claims, 6 Drawing Sheets

SYSTEM AND METHOD FOR REPLICATING OFFLINE SCHEDULING TRANSACTIONS FROM A CLIENT TO A SERVER

TECHNICAL FIELD

The described technology is directed generally to scheduling services and, more particularly, to replicating offline transactions to a remote service.

BACKGROUND

Efficient communication and collaboration among members of an organization is critical to the organization's success. Among organization members, face-to-face meetings have been the traditional manner of communicating, but, with the organizations becoming increasing geographically dispersed, these meetings often require travel on the part of attendees and, thus, are becoming increasingly cost prohibitive. The proliferation of computers and the advent of the Internet, and in particular, the maturing of the World Wide Web ("web"), has brought about a number of alternatives to the traditional face-to-face meeting.

Various scheduling applications, such as web conferencing, are available on the web and provide a less expensive alternative to the traditional face-to-face meeting. These scheduling applications are typically server applications that require network or web connectivity to access the provided services. For example, a user at a client computer needs to be online—i.e., there is an operable line of communication with the remote server, typically via a network—in order to access a scheduling application provided on a remote server. In the example of a web conferencing application, which provide synchronous or 'live' two-way online meetings and presentations, a user needs to be online to perform transactions on the remote web conferencing application, such as, schedule a web conference, invite attendees, change or cancel a scheduled web conference, participate in a scheduled web conference, etc.

Even though these scheduling applications provide increased efficiency and benefits, for example, by not requiring travel on the part of attendees, these scheduling applications still require users to be online to transact with the application. Because current networks and servers do not provide 100% reliability, there is no guarantee that users will always be online and able to transact with the remote server and the applications provided on the remote server. There may be instances where users transact with the remote application while offline—i.e., an operable line of communication with the remote server does not exist. Moreover, with the increasing use of wireless devices to access the scheduling applications, the ability for the scheduling applications to support offline transactions becomes even more desirable.

DETAILED DESCRIPTION

Figure 1:
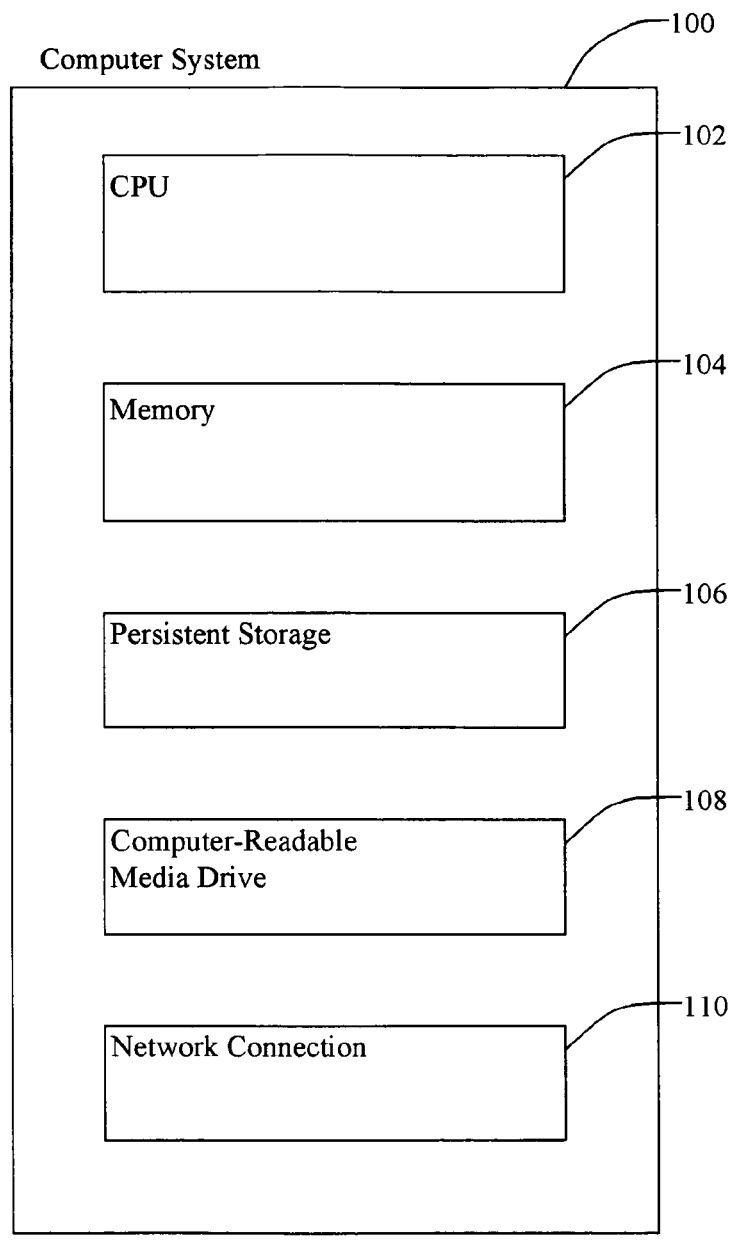
FIG. 1 is a block diagram illustrating selected components typically incorporated in at least some of the computer systems on which the facility executes.

Before describing the details of the current invention, some terminology used herein is described. The term "offline" generally refers to the absence of an operable line of communication between a client and a remote server. For example, when a mail client is offline, this indicates an absence of an operable line of communication between the mail client and a remote mail server. Conversely, the term "online" generally refers to the existence of an operable line of communication between the client and the remote server, regardless of whether the operable line of communication is being utilized.

A software facility for replicating offline transactions directed to a scheduling service ("the facility") is described. In some embodiments, the facility is implemented as a client-side application that integrates with and utilizes components of a store-and-forward application, such as a mail delivery application, on a client to guarantee that transactions submitted on the client can be carried out on a service hosted on a remote server even in light of intermittent connectivity between the client, the server, and networks. The guaranteed delivery feature provided by store-and-forward applications, such as conventional mail delivery applications, a mail outbox, and a transport extensibility mechanism, such as, by way of example, Messaging Application Programming Interface (MAPI), provide a reliable infrastructure for extending the benefits of guaranteed delivery to scheduling services, such as, collaboration applications, scheduling applications, calendaring applications, planning applications, etc.

A user utilizes a client device and transacts with a scheduling service hosted on a remote server by submitting requests directed to the scheduling service. Transactions submitted while the client device is online are sent to the scheduling service on the remote server through a connected network or multiple networks. Conversely, transactions submitted while the client device is offline are stored on the client device and sent to the scheduling service when the client device becomes online.

For example, records describing transactions intended for a scheduling application are written to an outbox of a mail delivery application on the client. The mail delivery application makes a determination of whether the client is online. If the mail delivery application determines that the client is online, the mail delivery application invokes the facility to process the contents of the outbox. When invoked, the facility iteratively retrieves items from the outbox and, for each item, determines whether the item is a transaction intended for the scheduling application. If the item is intended for the scheduling application, the facility sends the item to the scheduling application. Otherwise, if the item is not intended for the scheduling application, the facility returns the item to the outbox for processing by, for example, another process, such as a mail spooler component of the mail delivery application, a transport or delivery component of another remote service or application, etc.

Conversely, if the mail delivery application on the client determines that the client is offline, the mail delivery application does not invoke the facility. Rather, the mail delivery application continues to place transactions made while the client is offline into the outbox, while checking for online connectivity. Once the client becomes online, the mail delivery component invokes the facility to process the contents of the outbox. Thus, the mail delivery application ensures that the facility has a chance to process the contents of the outbox prior to the spooler component of the mail delivery application. In this manner, the facility enables a user to submit offline transactions destined for remote services, and ensures that the submitted offline transactions are replicated on the destined services when the client becomes online.

The various embodiments of the facility and its advantages are best understood by referring to FIGS. 1-8 of the drawings. The elements of the drawings are not necessarily to scale, emphasis instead being placed upon clearly illustrating the principles of the invention. Throughout the drawings, like numerals are used for like and corresponding parts of the various drawings.

FIG. 1 is a block diagram illustrating selected components typically incorporated in at least some of the computer systems on which the facility executes. These computer systems 100 may include one or more central processing units ("CPUs") 102 for executing computer programs; a computer memory 104 for storing programs and data—including data structures—while they are being used; a persistent storage device 106, such as a hard drive, for persistently storing programs and data; a computer-readable media drive 108, such as a CD-ROM drive, for reading programs and data stored on a computer-readable medium; and a network connection 110 for connecting the computer system to other computer systems, such as via the Internet, to exchange programs and/or data-including data structures.

The facility may be described in the general context of computer-readable instructions, such as program modules, executed by computer systems 100 or other devices. Generally, program modules include routines, programs, objects, components, data structures, etc. that perform particular tasks or implement particular abstract data types. Memory 104 and persistent storage device 106 are computer-readable media that may contain instructions that implement the facility. It will be appreciated that memory 104 and persistent storage 106 may have various other contents in addition to the instructions that implement the facility.

It will be appreciated that computer systems 100 may include one or more display devices for displaying program output, such as video monitors or LCD panels, and one or more input devices for receiving user input, such as keyboards, microphones, or pointing devices such as a mouse. While computer systems 100 configured as described above are typically used to support the operation of the facility, it will be appreciated that the facility may be implemented using devices of various types and configurations, and having various components.

In the discussion that follows, various embodiments of facility are further described in conjunction with a variety of illustrative examples. It will be appreciated that the embodiments of facility may be used in circumstances that diverge significantly from these examples in various respects.

For example, although various embodiments of the facility are described in conjunction with a scheduling service, such as a meeting planner, integrated into a mail delivery application, the facility is not to be limited to only those services and applications. As such, it will be appreciated that the facility, including the various features, can be adapted to work as a component of or in conjunction with applications that provide store-and-forward functionality.

Figure 2:
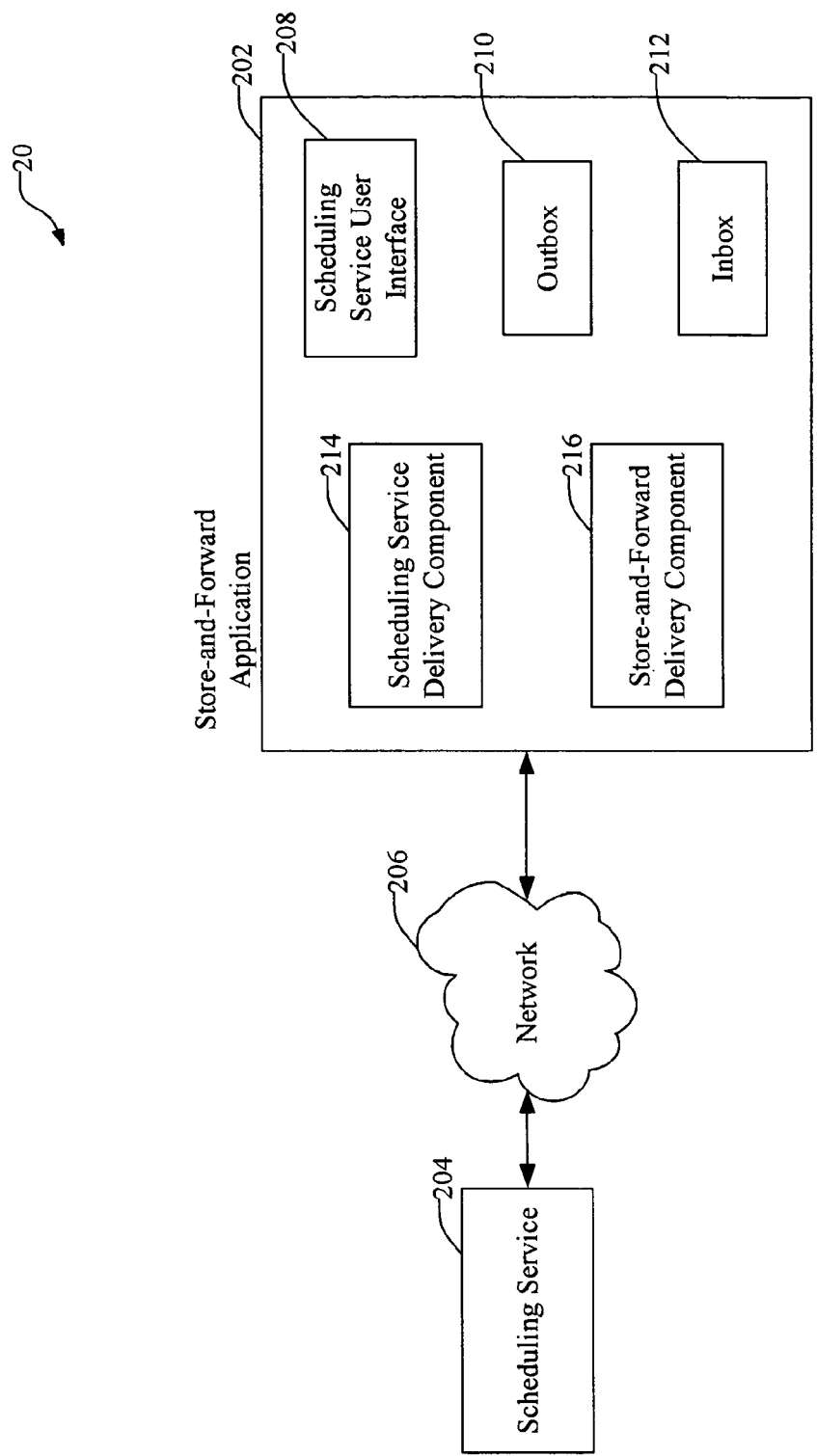
FIG. 2 is a high-level block diagram showing an environment in which the facility may operate.

FIG. 2 is a high-level block diagram showing an environment 20 in which the facility may operate. As depicted, environment 20 comprises a store-and-forward application 202 coupled to a scheduling service 204. In particular, store-and-forward application 202 and service 204 are coupled through a network 206. As used herein, the terms "connected," "coupled," or any variant thereof, means any connection or coupling, either direct or indirect, between two or more elements; the coupling of connection between the elements can be physical, logical, or a combination thereof.

In general terms, store-and-forward application 202 is a client application that comprises the facility and provides the infrastructure necessary to (1) enable a user to submit transactions while the client is offline, (2) store the transactions during the time the client is offline, and (3) send or transmit the stored transactions to an appropriate remote service when the client becomes online. Store-and-forward application 202 generally functions to store transactions on the client, determine the status of the network connectivity of the client, and ensure that the facility has a chance to process the transactions prior to processing by other components of store-and-forward application 202. As depicted, store-and-forward application 202 comprises a scheduling service user interface 208, an outbox 210, an inbox 212, a scheduling service delivery component 214, and a store-and-forward delivery component 216.

Scheduling service user interface 208 generally functions to provide an interface through which a user can transact with scheduling service 204. Scheduling service user interface 208 may be implemented as one or more graphical user interfaces that enable a user to submit transactions for a remote service. Upon receiving a transaction, scheduling service user interface 208 appropriately identifies the transaction as a transaction intended for the remote service and places the transaction in outbox 210 for further processing. In one embodiment, scheduling service user interface 208 identifies the transaction by impliedly addressing the intended remote service, for example, as an implied recipient of the transaction. For example, if the remote service is a meeting scheduling application, scheduling service user interface 208 may address the remote service as an implied attendee of a meeting.

Outbox 210 and inbox 212 generally function as a repository for the items that are processed by store-and-forward application 202. By way of example, in a mail delivery application, such as, Microsoft® Outlook®, outbox 210 and inbox 212 are designated as the folders that messages are sent from and delivered to, respectively. Outbox 210 and inbox 212 are folders that are used to hold messages while performing the call sequences—i.e., logic—to send and receive messages.

In general terms, scheduling service delivery component 214 comprises the facility. As such, scheduling service delivery component 214 generally functions to deliver transactions to a corresponding remote service. Store-and-forward application 202 invokes scheduling service delivery component 214 prior to invoking its own transport or delivery component upon determining that the client is online and there is an item to process in outbox 210. By way of example, if store-and-forward application 202 is a mail delivery application, store-and-forward application 202 invokes scheduling service delivery component 214 prior to invoking its mail spooler, which functions to deliver the messages from outbox 210.

In some embodiments, when invoked, scheduling service delivery component 214 retrieves an item, such as a message, from outbox 210, checks the item to determine whether the item is intended for processing by its corresponding service, and either sends the item to its corresponding service for processing, or returns the item back into outbox 210. Scheduling service delivery component 214 may also place an item or multiple items in inbox 212 to inform the user of the results of the processing of the transaction.

In various embodiments, depending on the functionality of the scheduling service, scheduling service delivery component 214 may need to place the item retrieved from outbox 210 back into outbox 210 subsequent to processing by the remote service. By way of example, the remote service may be a meeting application that is integrated into a mail delivery application, and the meeting application enables a user to schedule/modify/change meetings by specifying a date and time of a meeting or otherwise identifying the meeting, and one or more attendees or requested attendees. In this example, store-and-forward application 202 may create a meeting item addressed to the requested attendees and place the meeting item in outbox 210. Store-and-forward application 202 may also address a remote meeting service corresponding to the meeting application as an implied attendee of this meeting. Subsequently, scheduling service delivery component 214 that corresponds to the remote meeting service retrieves the meeting item from outbox 210, determines that the meeting item is for processing by its corresponding remote meeting service, and sends the meeting item to the remote meeting service for processing. The remote meeting service accordingly processes the meeting item and sends a response, which indicates the results of the processing to scheduling service delivery component 214. Based on the received response, scheduling service delivery component 214 may place the meeting item back in outbox 210 for processing by store-and-forward application 202—e.g., the mail delivery application. For example, the mail delivery application may then send the meeting item to each of the requested attendees.

A property associated with each item in outbox 212 may indicate whether the item is intended for processing by scheduling service delivery component 214. In some embodiments, for example, where store-and-forward application 202 is a mail delivery application, addressing of the remote service as an implied recipient of the item may serve as an indication that the item is for processing by an appropriate scheduling service delivery component 214.

In other embodiments, store-and-forward application 202 may retrieve the item from outbox 210, check to determine if the item is to be first processed by scheduling service delivery component 214, and if it is to be first processed by scheduling service delivery component 214, pass the item to scheduling service delivery component 214 for processing. For example, store-and-forward application 202 may maintain a list comprising of a type or multiple types of addresses that are appropriate for processing by scheduling service delivery component 214. Here, scheduling service delivery component 214 only receives items from store-and-forward application 202 that are appropriate for processing, and does not need to bother with items that are not intended for processing by scheduling service delivery component 214.

One skilled in the art will appreciate that store-and-forward application 202 may comprise multiple scheduling service delivery components 214. For example, store-and-forward application 202 may function as an interface to a plurality of remote services in addition to the store-and-forward service. In this instance, store-and-forward application 202 may comprise a distinct delivery component for each supported service. Here, store-and-forward application 202 may invoke each of the delivery components according to a predetermined sequence prior to invoking its own transport or delivery component.

Store-and-forward delivery component 216 generally functions as a transport for store-and-forward; application 202. For example, in the example where store-and-forward application 202 is a mail delivery application, store-and-forward delivery component 216 functions as a mail spooler.

In general terms, scheduling service 204 is the remote scheduling service to which the facility ensures delivery and replication of the offline transactions made on the client when the client becomes online. Scheduling service 204 may be any application whose operations are required to be carried out in a coherent manner. Stated anther way, scheduling service 204 can be any service that requires operations to be in order, such as scheduling applications in general.

Network 206 is a communications link that facilitates the transfer of electronic content between, for example, the attached computers. In one embodiment, network 206 includes the Internet. It will be appreciated that network 206 may be comprised of one or more other types of networks, such as a local area network, a wide area network, a point-to-point dial-up connection, and the like. It will also be appreciated that network 206 may not be present. For example, store-and-forward application 202 and scheduling service 204 may both reside on the same computing system and communicate via communication mechanisms, such as, inter-process communication, remote function call, internal communication buses, etc., typically supported on the computing system.

The aforementioned aspects of the facility and store-and-forward application 202 which hosts the facility are only illustrative and are not intended to suggest any limitation as to the implementation of the illustrated components and/or the scope of use or functionality of the facility or store-and-forward application 202. For example, in some embodiments, scheduling service user interface 208 need not be implemented as part of or integral to store-and-forward application 202, but may be implemented separate of or outside store-and-forward application 202, for example, as a client application and user interface which receives as input and passes to store-and-forward application 202 transactions intended for a remote service.

Figure 3:
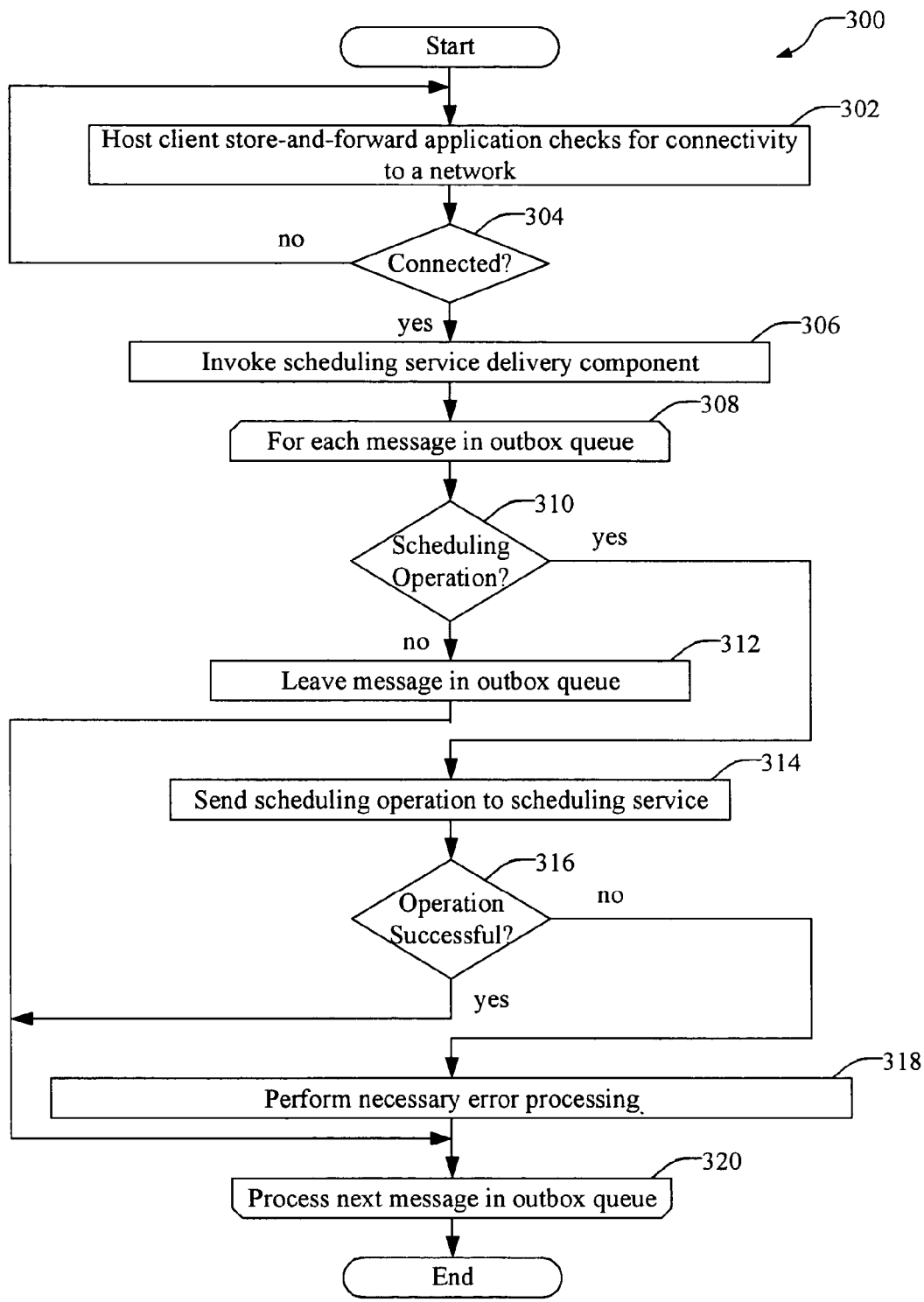
FIG. 3 illustrates a flow chart of a method by which the facility sends offline scheduling transactions to a server, according to some embodiments.

FIG. 3 illustrates a flow chart of a method 300 by which the facility sends offline scheduling transactions to a server, according to some embodiments. At step 302, host client store-and-forward application 202 checks for connectivity to a network. If host client store-and-forward application 202 determines that it is not connected—i.e., it is offline—at step 304, then host client store-and-forward application 202 returns to step 302 until it determines that it is connected. For example, host client store-and-forward application 202 may request to be interrupted when it becomes online, or may itself periodically poll the network to determine whether it becomes online.

If, at step 304, host client store-and-forward application 202 determines that it is connected—i.e., it is online—then, at step 306, host client store-and-forward application 202 invokes scheduling service delivery component 214. For each message in outbox 210, scheduling service delivery component 214 performs steps 310 to 318. At step 310, scheduling service delivery component 214 retrieves the next message form outbox 210 and checks the message to determine if it is a scheduling operation—e.g., a scheduling transaction—intended for processing by its corresponding remote scheduling service. If the message is not a scheduling operation, then, at step 318, scheduling service delivery component 214 leaves the message in or returns the message to outbox 210, and processes the next message in outbox 210 at step 320.

Otherwise, if, at step 310, scheduling service delivery component 214 determines that the message is a scheduling operation intended for processing by its corresponding remote scheduling service, then, at step 314, scheduling service delivery component 214 sends the message to the scheduling service for processing. At step 316, scheduling service delivery component 214 checks to determine whether the scheduling operation is successfully processed by the scheduling service. This may be indicated by a response message sent by the scheduling service to scheduling service delivery component 214. If scheduling service delivery component 214 determines that the scheduling operation is successfully processed, then scheduling service delivery component 214 processes the next message in outbox 210 at step 320.

Otherwise, if, at step 316, scheduling service delivery component 214 determines that the scheduling operation is unsuccessful, then, at step 318, scheduling service delivery component 214 performs any necessary error processing. In some embodiments, scheduling service delivery component 214 may place a message in inbox 212 informing of the resulting error and/or error condition. In other embodiments, depending on the encountered error and/or error condition, scheduling service delivery component 214 may pop—e.g., display—an error box informing the user of the encountered error, and help the user fix the problem. Subsequent to performing the error processing, scheduling service delivery component 214 processes the next message in outbox 210 at step 320.

One skilled in the art will appreciate that, for this and other processes and methods disclosed herein, the functions performed in the processes and methods may be implemented in differing order. Furthermore, the outlined steps are only exemplary, and some of the steps may be optional, combined with fewer steps, or expanded into additional steps without detracting from the essence of the invention.

In order to further describe the implementation and operation of the facility, it is hereafter discussed in the context of an example whose aspects are shown in FIGS. 4-8. In the example, store-and-forward application 202 is a mail application that provides an integrated calendaring application for a remote calendaring service. The calendaring application provides meeting request invitation, update, and cancellation mechanisms, which are used by its users to create or schedule meetings to participants, modify scheduled meetings or the list of participants, and cancel scheduled meetings. Further, these mechanisms are used to determine which changes should be made to the remote calendaring service and to queue those changes for later processing when store-and-forward application 202 is offline.

When a user utilizes one of the mechanisms to create, modify, or change a meeting, a corresponding message, which is addressed to one or more recipients, is placed in an outbox for delivery to the addressed recipients by the mail application. In this manner, the participants of a meeting are notified of a creation of a meeting and their requested participation in the meeting, or of modifications to, including cancellations of, scheduled meetings. In this example, it is assumed that either the calendaring application or the mail application provides an indication that these messages are to be first processed by the remote calendaring service prior to processing by the mail application—e.g., prior to delivery of the message to the addressed recipients. For example, the remote calendaring service may be included as an implied recipient of the message, which can serve as an indication to the facility to send the message to the remote calendaring service.

Figure 4:
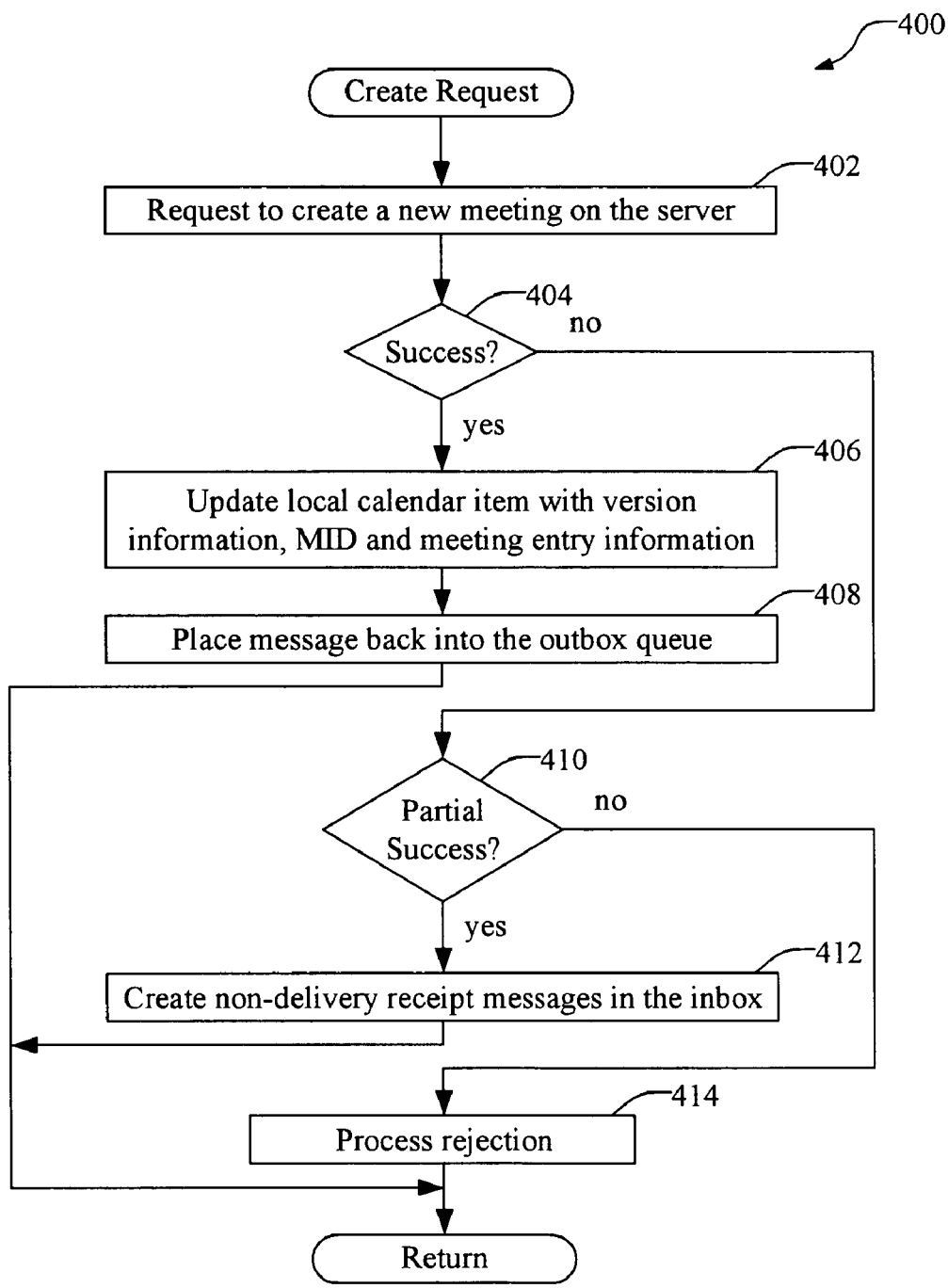
FIG. 4 illustrates a flow chart of a method by which the facility processes a request to create a meeting, according to some embodiments.

FIG. 4 illustrates a flow chart of a method 400 by which the facility processes a request to create a meeting, according to some embodiments. Here, the facility retrieves a message from the outbox queue of the mail application and determines that the message is a request to create a new meeting. At step 402, the facility sends the request to create a new meeting to the remote calendaring service. At step 404, the facility checks to determine if the request to create the meeting was processed successfully by the remote calendaring service. If the request was successfully processed by the remote calendaring service, then, at step 406, the facility updates a local calendar item in the calendaring application with version information, such as, a base version number, meeting identifier (MID), and meeting entry information for the newly scheduled meeting. For example, the base version number may be a version number that provides an indication of the number of times the corresponding meeting has been modified, and the MID may be an identifier that uniquely identifies the meeting. At step 408, the facility places the message back into the outbox queue.

If, at step 404, the facility determines that the request to create a new meeting was unsuccessful on the remote calendaring service, then, at step 410, the facility checks to determine whether the remote calendaring service was partially successful in processing the request to create the new meeting. For example, the remote calendaring service may have booked or scheduled the requested meeting and determined that the meeting requires certain access rights which may not be possessed by one or more of the invitees to the meeting. If the facility determines that the request was only partially successful, then, at step 412, the facility creates a non-delivery receipt message in the inbox queue of the mail application. The non-delivery receipt message provides details regarding the error.

If, at step 410, the facility determines that the remote calendaring service was not even partially successful in processing the request to create the new meeting, then, at step 414, the facility processes the rejection. Rejection processing is further discussed below in conjunction with method 800.

Figure 5:
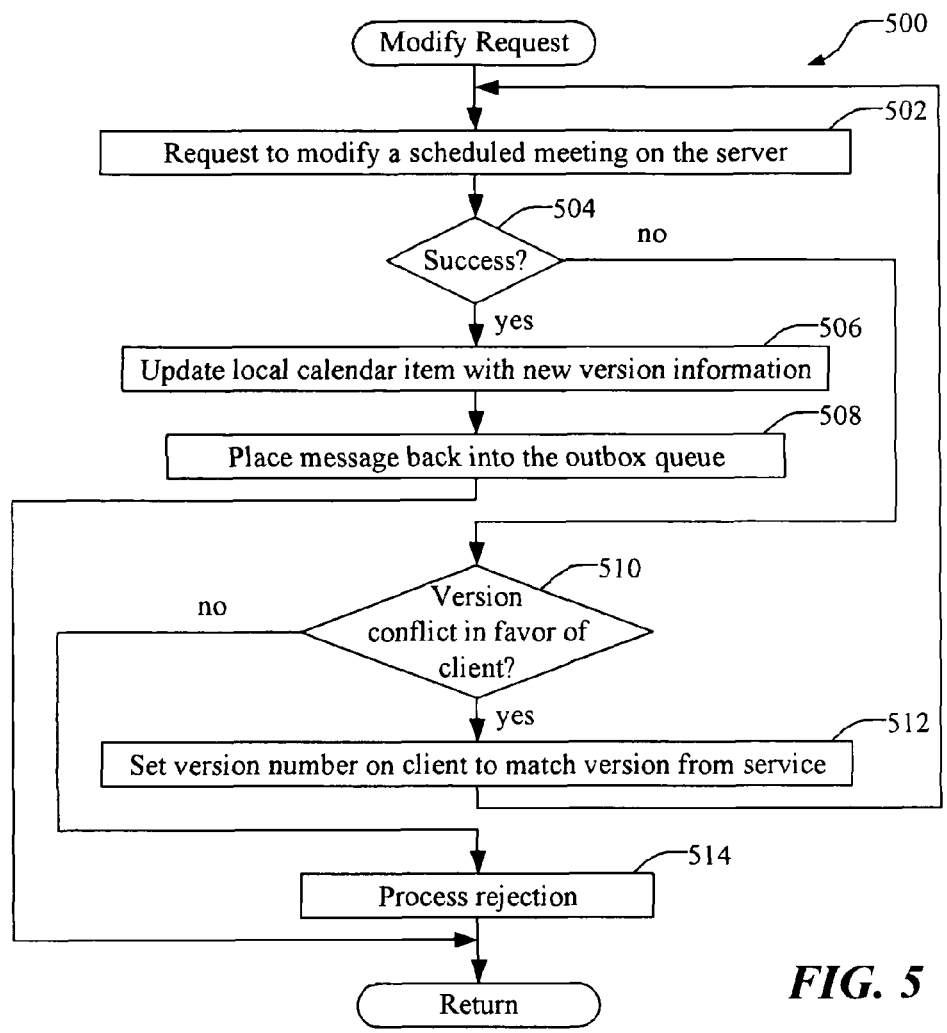
FIG. 5 illustrates a flow chart of a method by which the facility processes a request to modify a scheduled meeting, according to some embodiments.

FIG. 5 illustrates a flow chart of a method 500 by which the facility processes a request to modify a scheduled meeting, according to some embodiments. Here, the facility retrieves a message from the outbox queue of the mail application and determines that the message is a request to modify a scheduled meeting. At step 502, the facility sends the request to modify a scheduled meeting to the remote calendaring service. At step 504, the facility checks to determine if the request to modify the meeting was processed successfully by the remote calendaring service. For example, the remote calendaring service may require that the base version number of the meeting has not changed—e.g., the base version number sent with the modify request matches the base version number maintained by the remote calendaring service—in order to modify the scheduled meeting. If the request was successfully processed by the remote calendaring service, then, at step 506, the facility updates the local calendar item in the calendaring application with updated version information including information, such as, a new base version number, last edit location, time of modification, etc. At step 508, the facility places the message back into the outbox queue.

If, at step 504, the facility determines that the request to modify the scheduled meeting was unsuccessful on the remote calendaring service, then, at step 510, the facility checks to determine whether this was the result of a version conflict and, further, whether the version conflict was resolved in favor of the client—i.e., resolved in favor of the request to modify. If the facility determines that the version conflict was resolved in favor of the client, then, at step 512, the facility sets the version number on the client to match the version number maintained by the service, and returns to step 502 to send the request to modify the scheduled meeting to the remote calendaring service. Version conflict processing is further discussed below in conjunction with method 700. If, at step 510, the facility determines that there was no version conflict or that there was a version conflict but the version conflict was not resolved in favor of the client, then, at step 514, the facility processes the rejection.

Figure 6:
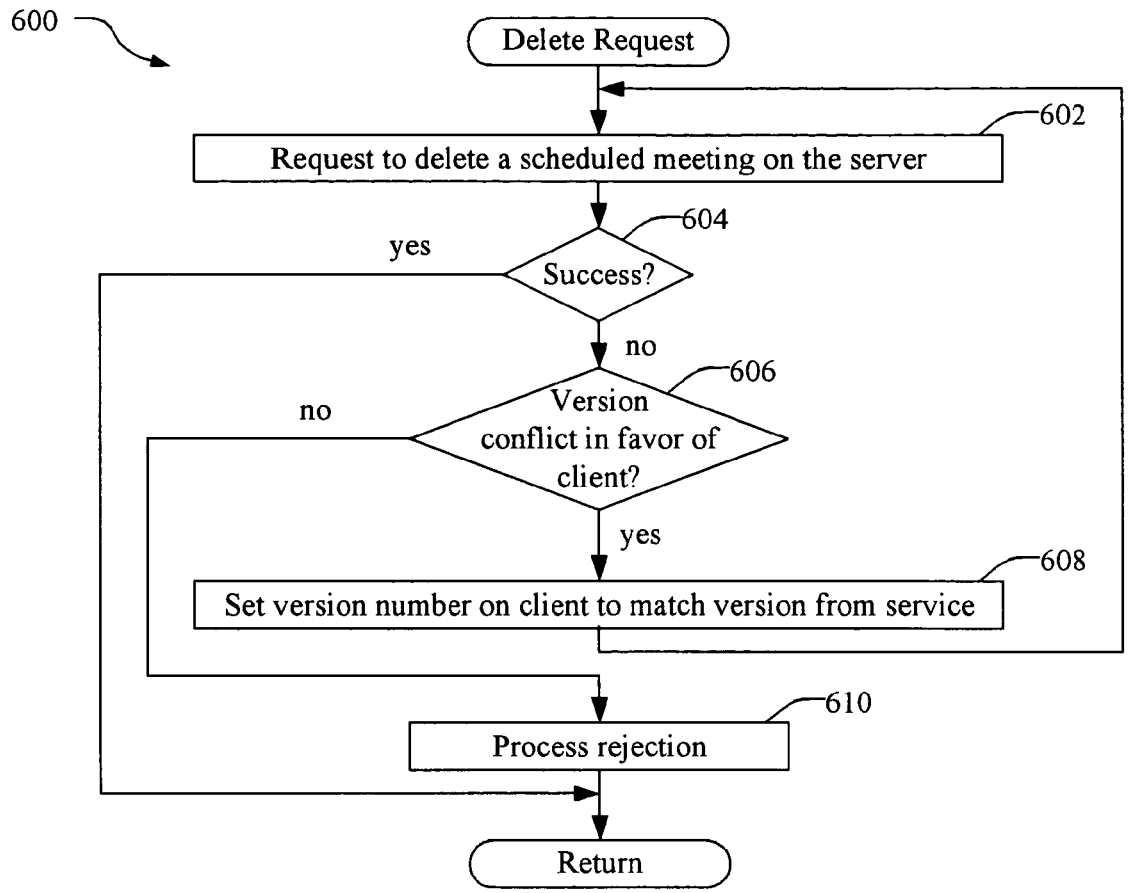
FIG. 6 illustrates a flow chart of a method by which the facility processes a request to delete a scheduled meeting, according to some embodiments.

FIG. 6 illustrates a flow chart of a method 600 by which the facility processes a request to delete a scheduled meeting, according to some embodiments. Here, the facility retrieves a message from the outbox queue of the mail application and determines that the message is a request to cancel a scheduled meeting. At step 602, the facility sends the request to delete a scheduled meeting to the remote calendaring service. At step 604, the facility checks to determine if the request to cancel the meeting was processed successfully by the remote calendaring service. For example, similar to the requirement for modifying a scheduled meeting, the remote calendaring service may require that the base version number of the meeting has not changed in order to cancel the scheduled meeting. If the request was successfully processed by the remote calendaring service, the facility takes no further action on the client.

If, at step 604, the facility determines that the request to modify the scheduled meeting was unsuccessful on the remote calendaring service, then, at step 606, the facility checks to determine whether this was the result of a version conflict and, further, whether the version conflict was resolved in favor of the client—i.e., resolved in favor of the request to cancel. If the facility determines that the version conflict was resolved in favor of the client, then, at step 608, the facility sets the version number on the client to match the version number maintained by the service, and returns to step 602 to send the request to cancel the scheduled meeting to the remote calendaring service. Version conflict processing is further discussed below in conjunction with method 700. If, at step 606, the facility determines that there was no version conflict or that there was a version conflict but the version conflict was not resolved in favor of the client, then, at step 610, the facility processes the rejection.

Figure 7:
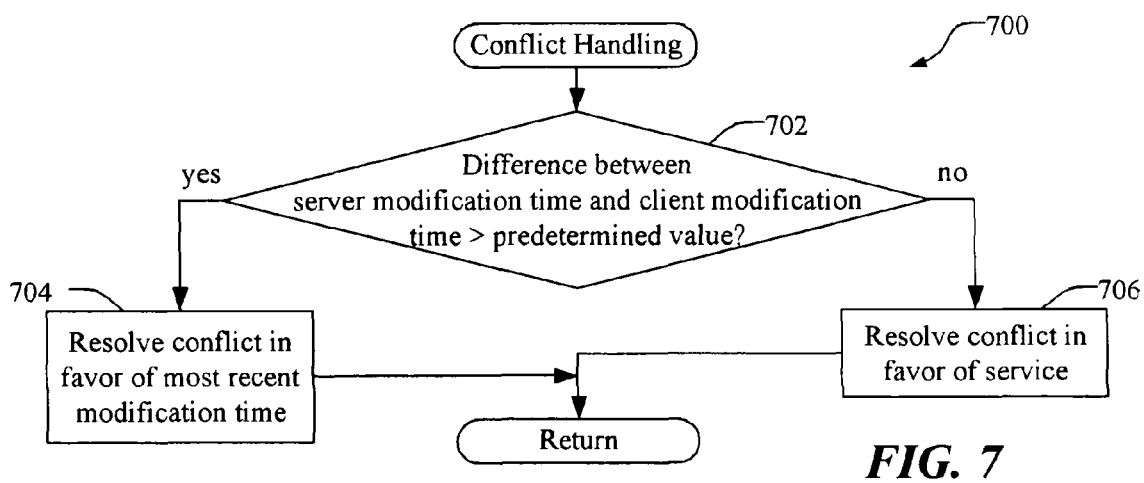
FIG. 7 illustrates a flow chart of a method for conflict resolution, according to some embodiments.

FIG. 7 illustrates a flow chart of a method 700 for conflict resolution, according to some embodiments. The remote calendaring service may perform the conflict resolution to account for the possibility that a scheduled meeting may have been changed in some manner from a variety of sources. For example, a user may have scheduled a meeting and subsequently changed something regarding the meeting offline. Subsequent to the scheduling of the meeting and prior to the offline change being sent to the service, another user may have requested a change to the scheduled meeting, for example, through a direct interface of the calendaring service.

At step 702, the remote calendaring service checks to determine whether the difference between the server modification time and the client modification time—i.e., the modification time associated with the client request—are different by at least some predetermined value—i.e., number of minutes. If the difference between the times is not within the predetermined number of minutes, then, at step 704, the calendaring service resolves the conflict in favor of the most recent modification time. Alternatively, ff the difference between the times is within the predetermined number of minutes, then, at step 704, the calendaring service resolves the conflict in favor of the service. Within the predetermined number of minutes, there is a risk that the calendaring service may make the wrong decision because of clock drift, thus, within this window the calendaring service resolves the conflict in favor of the service over the client.

Figure 8:
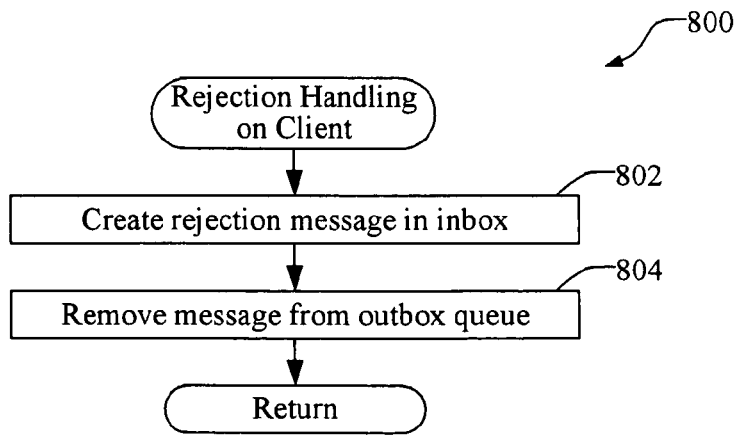
FIG. 8 illustrates a flow chart of a method by which the facility processes a rejection of a request, according to some embodiments.

FIG. 8 illustrates a flow chart of a method 800 by which the facility processes a rejection of a request, according to some embodiments. At a step 802, the facility creates a rejection item in the inbox. In one embodiment, the rejection item includes the information from the request that was rejected by the remote scheduling service. The facility may use the rejection item to explain the rejection and provide the user the option to address the rejection. For example, the facility may provide the user the ability to open a relevant mail application item, perform some edits, and submit the request again. At step 804, the facility removes the message from the outbox queue.

From the foregoing, it will be appreciated that embodiments of the invention have been described herein for purposes of illustration, but that various modifications may be made without deviating from the spirit and scope of the invention. Accordingly, the invention is not limited except in accordance with elements explicitly recited in the appended claims.

We claim:

1. A computer-readable storage medium that is not a signal encoded with computer-executable instructions for execution by a computer implementing a store-and-forward application comprising:

an outbox that maintains a queue of items;

an interface that receives a transaction for a first remote service, and for placing the transaction in the outbox, the transaction being generated by a first application that is different from the store-and-forward application, the store-and-forward application for sending items using a second remote service that is different from the first remote service;

an invocation component that invokes a service delivery component of the first application for retrieving an item from the outbox, for determining whether the item is a transaction for the first remote service, for sending the item to the first remote service without use of the second remote service in response to determining that the item is a transaction for the first remote service, and for placing the item back in the outbox in response to determining that the item is not a transaction for the first remote service;

a store-and-forward delivery component for processing items in the outbox subsequent to processing by the service delivery component for delivery to the second remote; and a network connectivity component for determining a network connectivity state of the store-and-forward application, and for first invoking the service delivery component via the invocation component and second invoking the store-and-forward delivery component in response to determining that the network connectivity state indicates online wherein the first remote service is hosted by a first remote server, the second remote service is hosted by a second remote server, the first remote server being different from the second remote server, and the first remote server being connected to the computer via a network and the second remote server being connected to the computer via the network.

2. The computer-readable storage medium of claim 1, wherein the service delivery component is further for placing an item in an inbox of the store-and-forward application subsequent to processing by the first remote service.

3. The computer-readable storage medium of claim 1, wherein the service delivery component is further for placing the item back in the outbox subsequent to processing by the first remote service for processing by the store-and-forward delivery component.

4. The computer-readable storage medium of claim 1, wherein the service delivery component is further for placing the item back in the outbox subsequent to processing by the first remote service for processing by the service delivery component.

5. The computer-readable storage medium of claim 1 further comprising a second invocation component that invokes a second service delivery component of a second application for communicating with a third remote service, for retrieving an item from the outbox, determining whether the item is a transaction for the third remote service, for sending the item to the third remote service in response to determining that the item is a transaction for the third remote service, and for placing the item back in the outbox in response to determining that the item is not a transaction for the third remote service, wherein the second service delivery component processes items in the outbox subsequent to processing by the service delivery component and prior to processing by the store-and-forward delivery component.

6. A computer-readable storage medium that is not a signal whose contents cause a computer to:
receive as input a transaction for a first remote service, the first remote service for scheduling meetings, the transaction being created by and provided by a scheduling application executing on the computer; and
place the transaction as an item in an outbox of a store-and-forward application for processing by the store-and-forward application,
the store-and-forward application being an electronic mail application for sending electronic mail messages in the outbox to a second remote service for delivery of the electronic mail messages to a recipient,
the second remote service being different from the first remote service and the store-and-forward application being different from the scheduling application,
the store-and-forward application for:
determining whether there is network connectivity for a network, and
responsive to determining that there is network connectivity, for processing the items in the outbox by:
invoking a service delivery component of the scheduling application to:
retrieve an item from the outbox,
determine whether the item is a transaction for the first remote service,
send the item to the first remote service without use of the second remote service in response to determining that the item is a transaction for the first remote service, and
place the item back in the outbox in response to determining that the item is not a transaction for the first remote service, and
after invoking the service delivery component of the scheduling application, invoking a transport component of the store-and-forward application to send electronic mail messages in the outbox to the second remote service
such that the service delivery component is invoked prior to the transport component of the store-and-forward application so that the service delivery component uses capabilities of the store-and-forward application for determining whether there is network connectivity and wherein the first remote service is hosted by a first remote server, the second remote service is hosted by a second remote server, the first remote server being different from the second remote server, and the first remote server being connected to the computer via a network and the second remote server being connected to the computer via the network.

7. The computer-readable storage medium of claim 6, wherein the input transaction is received through the store-and-forward application.

8. The computer-readable storage medium of claim 6, wherein the service delivery component is further for placing the item back in the outbox subsequent to processing by the first remote service.

9. The computer-readable storage medium of claim 6, wherein the service delivery component is further for placing an item in an inbox of the store-and-forward application subsequent to processing by the first remote service.

10. A computer-implemented method for replicating offline transactions from a client to a server, the method comprising:
receiving as input on a client from a first application a transaction for a first remote service;
placing the input transaction as an item in an outbox of a store-and-forward application, the first application being different from the store-and-forward application, the store-and-forward application for sending items using a second remote service that is different from the first remote service;
determining whether the client is online or offline;
responsive to determining that the client is offline, maintaining the transaction in the outbox for subsequent processing when the client becomes online; and
responsive to determining that the client is online,
first invoking by the store-and-forward application a service delivery component of the first application that retrieves an item from the outbox, that determines whether the item is a transaction for the first remote service, that sends the item to the first remote service without use of the second remote service in response to determining that the item is a transaction for the first remote service, and that places the item back in the outbox in response to determining that the item is not a transaction for the first remote service for processing by a transport component of the store-and-forward application; and
second invoking by the store-and-forward application the transport component of the store-and-forward application that retrieves an item from the outbox and that sends the item to the second remote service
the first remote service being hosted by a first remote server, the second remote service being hosted by a second remote server, the first remote server being different from the second remote server, and the first remote server being connected to the client via a network and the second remote server being connected to the client via the network.

11. The method of claim 10, wherein the service delivery component sends the item to the first remote service via a network.

12. The method of claim 10, wherein the first remote service is a collaboration application.

13. The method of claim 10, wherein the store-and-forward application is a mail application.

14. The method of claim 10, wherein the service delivery component is further for placing the item back in the outbox subsequent to processing by the first remote service for processing by the transport component of the store-and-forward application.

15. The method of claim 10, wherein the service delivery component is further for placing the item back in the outbox subsequent to processing by the first remote service for re-sending to the first remote service.

16. The method of claim 10, wherein the service delivery component is further for placing an item in an inbox of the store-and-forward application subsequent to processing by the first remote service.

\* \* \* \* \*